United States Patent [19]

French

[11] Patent Number: 4,539,533
[45] Date of Patent: * Sep. 3, 1985

[54] DIGITAL MSK MODULATOR

[75] Inventor: Don M. French, San Diego, Calif.

[73] Assignee: The United States of America as represented by the Secretary of the Navy, Washington, D.C.

[*] Notice: The portion of the term of this patent subsequent to Jul. 3, 2001 has been disclaimed.

[21] Appl. No.: 250,777

[22] Filed: Apr. 3, 1981

[51] Int. Cl.³ ..................... H04L 27/12; H03K 7/06
[52] U.S. Cl. ............................... 332/9 R; 332/16 R; 375/47
[58] Field of Search ................... 332/9 R, 9 T, 10, 14, 332/16 R, 16 T; 375/47, 64

[56]   References Cited
U.S. PATENT DOCUMENTS 3,731,233  5/1973  Hutchinson ...................... 375/64 X
4,066,841  1/1978  Young ............................. 375/64 X

OTHER PUBLICATIONS

H. W. Braun, "CMOS FSK Modulator", Elektor, vol. 4, No. 7-8, Jul./Aug. 1978, pp. 7-69, (article 72).

Primary Examiner—Siegfried H. Grimm
Assistant Examiner—W. R. Paxman
Attorney, Agent, or Firm—Robert F. Beers; Ervin F. Johnston; Terrance A. Meador

[57]   ABSTRACT

A digital apparatus for performing minimum-shift-keying (MSK) modulation includes an oscillatory circuit which provides two frequencies related in a predetermined manner, and also includes a processing circuit which divides a stream of digital data to be transmitted into two parallel substreams, one substream comprising even numbered bits from the serial stream and the other substream comprising odd numbered bits from the serial stream. A combining circuit selects one of the frequencies provided by the oscillatory circuit according to the equivalence or divergence of the states of the digital substreams, and further provides as an output the selected frequency waveform or its inverse according to the state of one of the substreams.

14 Claims, 3 Drawing Figures

DIGITAL MSK MODULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention herein disclosed and claimed pertains to the field of data transmission. More particularly, the invention is in the field of modulation techniques for data transmission, which includes the field of minimum-shift-keying (MSK). The field of the invention includes the field of MSK modulators constructed using digital components.

When applied to the transmission of digital information, the technique of MSK modulation involves the use of a pair of related transmission frequencies between which a modulator is switched according to the state of the data to be transmitted. If the two frequencies are denoted $f_u$ and $f_1$, where $f_u$ denotes the greater and $f_1$ the lesser of the two frequencies, then $f_u$ will be transmitted in the case of a current digital bit which follows an immediately preceding digital bit of the opposite value. Similarly, the transmission of $f_1$ will denote the presence of a digital bit following an immediately preceding digital bit of the same value. The values of the frequencies are so selected that a change from one to the other will result in no change of phase in the composite modulated waveform. Reference is given to the article "Simplified MSK Signaling Technique," by Amoroso and Kivett in the *IEEE Transactions on Communications*, April 1977, pp. 433-441.

As far as is known, the application of MSK modulation theory to modulator design involves the use of analog circuits to develop a phase-continuous, modulated wave by means of successive mixings of sinusoids under the control of a phasor differential signal derived from the stream of data to be transmitted. See, for example, "The Effect of Tandem Band and Amplitude Limiting on the $E_b/N_o$ Performance of Minimum (Frequency) Shift Keying," by Mathwich, et al., in the *IEEE Transactions on Communications*, October 1974, pp. 1525-1539. Because of the use of analog circuitry, the precise phase relationships required for analog MSK modulation are difficult to maintain in the face of changes in ambient temperature and of component ageing. Both effects can vary the value of components which generate and process the sinusoids; variations on component values are reflected in unwanted shifts in frequency and phase of the waveforms.

The employment of digital circuitry can provide an MSK modulator with the capability of maintaining phase precision in the face of ambient temperature change and component ageing because of the greater inherent operational stability enjoyed by digital devices. In addition, programmable digital devices provide the opportunity to maintain a portfolio of automatically selectable data transmission rates which can be changed by simple reprogramming as conditions require. A programmable transmission rate portfolio can include preselected frequency values which can be synthesized quite simply by a change in the frequency of a digital clock source. Needs for such complicated analog circuits as mixers, balanced modulators, and precise amplitude combiners can be eliminated.

SUMMARY OF THE INVENTION

In the present invention, there is disclosed a digital minimum-shift-keying (MSK) modulator including two oscillatory circuits which develop, from a master clock signal of fixed frequency, a first digital waveform of variable frequency, and a second digital waveform of variable frequency, not equal to the first. The first and second frequencies bear a predetermined relation necessary to the synthesis of an MSK waveform. A processing circuit responds to a serial stream of digital data intended to modulate the MSK wave. The serial stream has a clock frequency, $f_o$, and comprises successive bit periods enumerated alternately as odd and even. The processing circuit separates the serial stream into two substreams each having a clock frequency $f_o/2$, one substream comprising the succession of even numbered bit periods of the serial stream, and the other substream comprising the succession of odd numbered bit periods of the serial stream. Finally, a combining circuit is coupled to the oscillatory circuit and to the processing circuit for selecting one of the digital waveforms when the states of the substreams are equivalent and the other digital waveform when the states of the substreams are opposite. The combining circuit further responds to the state of one substream when the selection is made to provide either the selected waveform or its inverse as an output.

OBJECTS OF THE INVENTION

An object of the invention is to provide a new and improved MSK modulator employing programmable digital circuitry.

Another object is to provide an improved MSK modulator which provides for the transmission of digital data at separate, selectable baud rates.

A further object of the invention is to provide an MSK modulator in which required phase relationships are easily generated and maintained with digital techniques.

A still further object of the invention is to provide a new and simplified MSK modulator which eliminates the necessity for analog waveform generation.

These and other objects of the invention will become more readily apparent from the ensuing specification when taken together with the drawings.

BRIEF DESCRIPTION OF THE DRAWINGS

FIG. 3 shows elements of FIG. 1 in greater detail.

DESCRIPTION OF THE PREFERRED EMBODIMENT

The well-known MSK modulation technique provides for transmission of digital data on a composite carrier wave whose frequency spectrum is composed of two discrete frequencies, denoted $f_u$ and $f_1$, where $f_u > f_1$. A digital waveform having a baud rate, B, causes the composite wave to switch between the two frequencies when certain prespecified conditions occur in the modulating digital waveform. At the transition point between the frequencies, the phase of the composite wave is constrained to remain constant. Finally, the technique requires $f_u$ and $f_l$ to be spaced from the fundamental frequency of the carrier by exactly B/4, resulting in a modulation index of ½. A standard relation combining B, $f_u$, and $f_l$ is:

$$f_u = \frac{B}{2}(n + 1) \quad (1)$$

$$f_l = \frac{B}{2}n$$

where n is any rational number.

To implement the MSK technique in the disclosed invention, a serial stream of digital data comprising the modulating waveform is divided into two subchannels, designated as channel X and channel Y. Channel X comprises the succession of data bits contained in the even-numbered intervals of the serial data stream, and channel Y contains the succession of data bits contained in the odd-numbered intervals. A protocol of mark/space identities for these channels can be assigned as follows:

a = +1 for X marks
a = −1 for X spaces
b = +1 for Y marks
b = −1 for Y spaces

Using these identities, the MSK signal, S, can be expressed as:

$$S = A\{b \cos(\omega_o + c\omega_f)\} \quad (2)$$

where $\omega_o$ is the fundamental carrier frequency, $\omega_f = B/4$, and $c = \pm 1$, as defined by the following:

| a | b | c |
|---|---|---|
| +1 | +1 | −1 |
| −1 | +1 | +1 |
| +1 | −1 | +1 |
| −1 | −1 | −1 |

Clearly, when $c = -1$, $(\omega_o - \omega_f) = 2\pi f_l$, and, when $c = +1$, $(\omega_o + \omega_f) = 2\pi f_u$. The b term selects either the positive cosine function or its inverse. Since the operator c compares the X and Y channels by means of the exclusive-or operation, it is apparent that $f_u$ is selected when the present digital bit of the modulating waveform differs from the bit immediately preceding it. Likewise $f_l$ is selected when successive bits do not differ.

Figure 1:
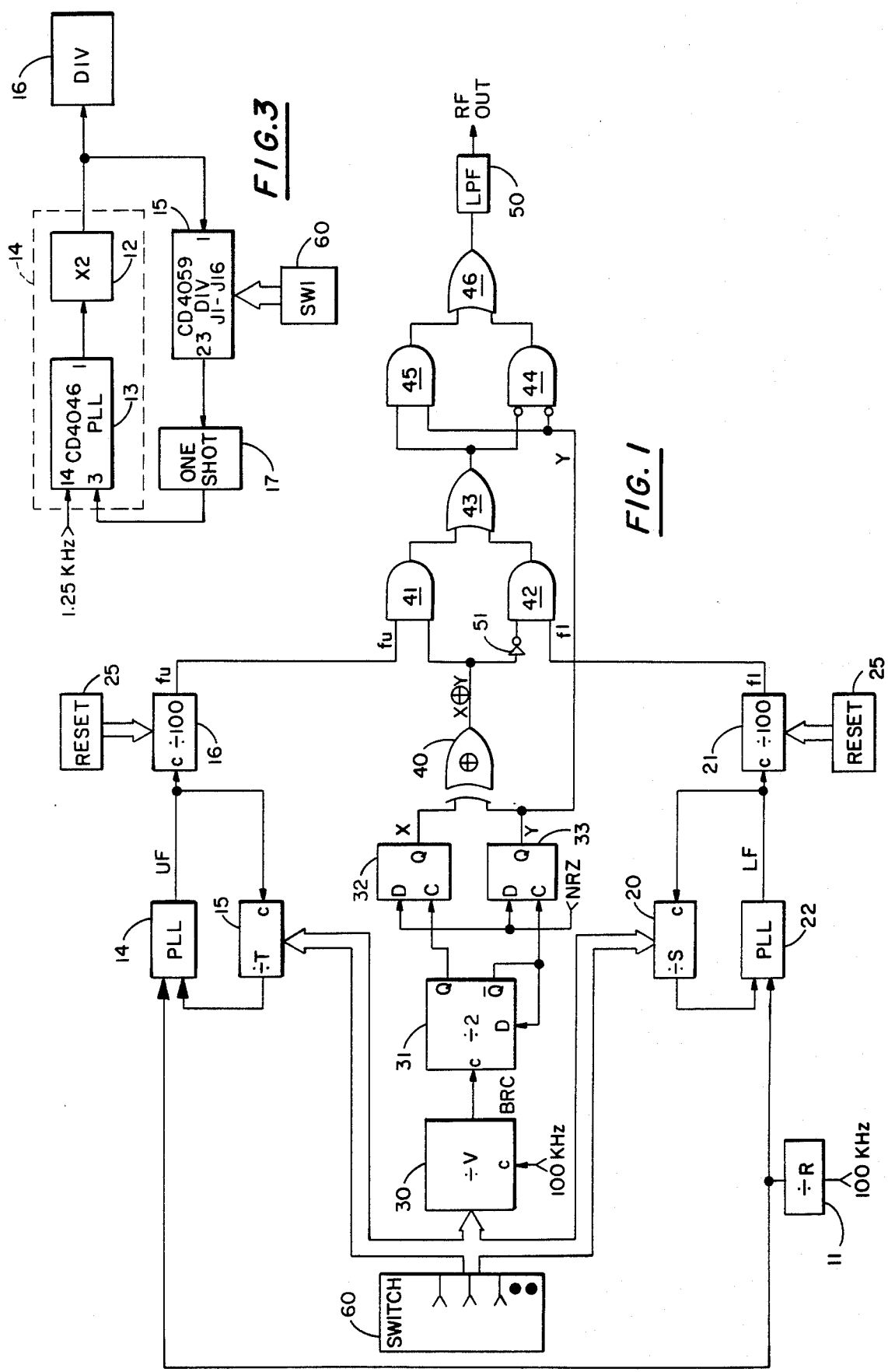
FIG. 1 shows a block diagram of an embodiment of the invention.

With reference to FIG. 1 there is shown an apparatus which implements the MSK technique and provides a digital MSK modulator with a set of selectable baud rates.

An oscillatory circuit which produces $f_u$ and $f_l$ comprises a divide-by-R (divider) circuit 11, two phase-locked loops (PLL) 14 and 22, programmable divide-by-T (divider) circuit 15, programmable divide-by-S (divider) circuit 20, and two presettable divide-by-100 (divider) circuits 16 and 21.

A master clock signal of 100 KHz is fed to the clock input of divider circuit 11 which generates a reference signal, $f_r = 100$ KHz/R. The frequency reference $f_r$ is fed to one input of PLL 14 and to one input of PLL 22. The other input of PLL 14 is fed by programmable divider 15. Divider circuit 15, in turn, takes its input from the output of PLL 14. Together PLL 14 and divider circuit 15 form a feedback loop by which, according to well-known phase lock techniques, the frequency of the signal produced by PLL 14 can be varied by varying the divisor T. (See Motorola application note AN-535, "Phase-Lock Loop Fundamentals", by Garth Nash). Similarly, PLL 22 and programmable divider 20 form a variable frequency source.

In the preferred embodiment, the divider circuit 11 comprises a counter configured to divide by 10, cascaded with a divide-by-8 divider (RCA parts CD 4017 and CD 4022) which together divide the 100 KHz by 80 to produce a 1.25 KHz reference waveform.

Both programmable divider 15 and programmable divider 20 can be programmable counters such as the RCA CD4059. With the connection of a baud rate switch 60 (which can be a rotary switch together with a code selection converter) to the programmable inputs of divider circuits 15 and 20, S and T can be varied by changing the switch setting.

The combination of programmable divider 15 and PLL 14 provides a source clock waveform, UF, of variable frequency from which the upper frequency $f_u$ is obtained. Likewise, programmable divider 20 and PLL 22 form a source of variable frequency source clock, LF, from which the lower frequency $f_l$ can be obtained. In the preferred embodiment, the coding interfaces between baud rate switch 60 and the dividers 15 and 20 are so constructed as to maintain S and T in a numerical relation which enable LF and UF (and $f_l$ and $f_u$) to satisfy equation (1) for any setting of the switch 60.

FIG. 3 illustrates one possible circuit combination which will implement the UF and LF frequency sources. PLL 14 (or 22) comprises PLL 13 (RCA part CD 4046) together with multiplier circuit 12 which extends the frequency range of the loop. Divider circuit 15 (or divider circuit 20) provides its output to the comparator input of PLL 13 through one-shot circuit 17.

In the preferred embodiment, $f_u$ is developed from the source clock UF by division of the ouptut of PLL 14 through presettable divider circuit 16. Divider circuit 16 comprises a presettable binary counter configured to divide by 100. It can, for example, comprise two cascaded (RCA) CD4018 counters, each configured to divide by 10. The output of PLL 14 feeds the clock input of the divider circuit 16. The divider circuit 16 is set initially to a count of 75 in order to ensure that $f_u$ is properly phased for synthesis of a cosine wave as required equation (2). Thus, assuming a positive output from the preset divider 16, each cycle of $f_u$ will exhibit a positive state for the first 25 percent of one oscillation, a negative state for the next 50 percent, and will return to the positive state for the remaining 25 percent. Proper processing of this waveform, through a lowpass filter for instance, will result in a cosine wave.

Reset circuit 25 provides a signal to periodically reset the presettable divider 16 to its initial count of 75, or when, for instance, the modulator is turned on or the baud rate is changed.

The lower frequency, $f_l$, is developed in the same manner as $f_u$. The output of PLL 22 is fed through presettable divider circuit 21, which is set initially to a count of 75.

The frequency selection protocol described hereinabove is developed by processing circuitry comprising a programmable divider 30, a divide-by-two circuit 31, and D flip-flops 32 and 33. Programmable divider 30 is configured to accept as its clock signal the same 100 KHz provided to divide-by-R circuit 11. Baud rate switch 60 furnishes program inputs which control the value of the divisor V. The divisor V is selected to enable the programmable divider 30 to generate as an output an oscillatory, digital baud rate clock waveform, BRC, which establishes the baud rate of the modulator. The signal BRC is provided as a clock input to divide-by-two circuit 31 which, in turn, provides a pair of orthogonal signals at its Q and $\bar{Q}$ outputs which are used to clock, respectively, D flip-flop 32 and D flip-flop 33. The serial stream of digital data which is to be encoded by the modulator is provided simultaneously at the D inputs of D flip-flops 32 and 33. This stream can comprise, for example, a non-return-to-zero, NRZ, waveform having a data rate $f_o$. Selecting BRC to equal $f_o$ will cause the D flip-flops 32 and 33 to separate the serial digital stream into two substreams each having a data rate $f_o/2$, which appear at the Q outputs of the D flip-flops. In the preferred embodiment, the substream output by D flip-flop 32 will comprise all of the alternate bits, beginning with the first, contained in the NRZ serial streams. Similarly, the D flip-flop 33 will form a substream composed of all of the alternate bits, beginning with the second, of the same serial stream.

The variability of BRC enables one to select from a portfolio of baud rates. The interface between the baud rate switch 60 and the programmable divider is designed to maintain V in a relation with T and S which will ensure that BRC, $f_u$, and $f_1$ satisfy equation (1). The variability of V, T, and S gives the modulator of FIG. 1 the ability to accomodate a variety of data rates and establishes a portfolio of baud rates.

The programmable divider 30 can be constructed using the RCA CD 4059 programmable counter. The divide-by-two circuit 31 and flip-flops 32 and 33 can be selected from the large group of standard bistable digital devices.

A combining circuit comprising gates 40 through 46 and an inverter 51 utilizes the substreams developed by the D flip-flops 32 and 33 to select between $f_u$ and $f_1$ in such a manner as to encode the NRZ stream into a phase-continuous, modulated carrier wave bearing the characteristics of equation (2). An exclusive-OR gate 40 accepts as inputs the digital substreams present at the Q outputs of the D flip-flops 32 and 33. The positive output of the XOR gate 40 is provided as an input to AND gate 41 The inverted output of XOR gate 40 is provided through inverter 51 as an input to AND gate 42. Also present as an input to AND gate 41 is $f_u$, taken from the output of the presettable divider 16. Likewise, $f_1$ is fed from the output of presettable divider 21 to the input of AND gate 42. The outputs of AND gates 41 and 42 are fed to the input of OR gate 43. The positive output of the OR gate 43 is combined with the positive substream provided by the D flip-flop 33 at AND gate 45. Similarly, the positive outputs of the OR gate 43 and the D flip-flop 33 are provided to inverting inputs of AND gate 44. The outputs of the AND gates 44 and 45 are combined at the OR gate 46. The ouptut of the OR gate 46 is fed directly to the lowpass filter 50 which provides the modulated RF output of the modulator of FIG. 1.

Figure 2:
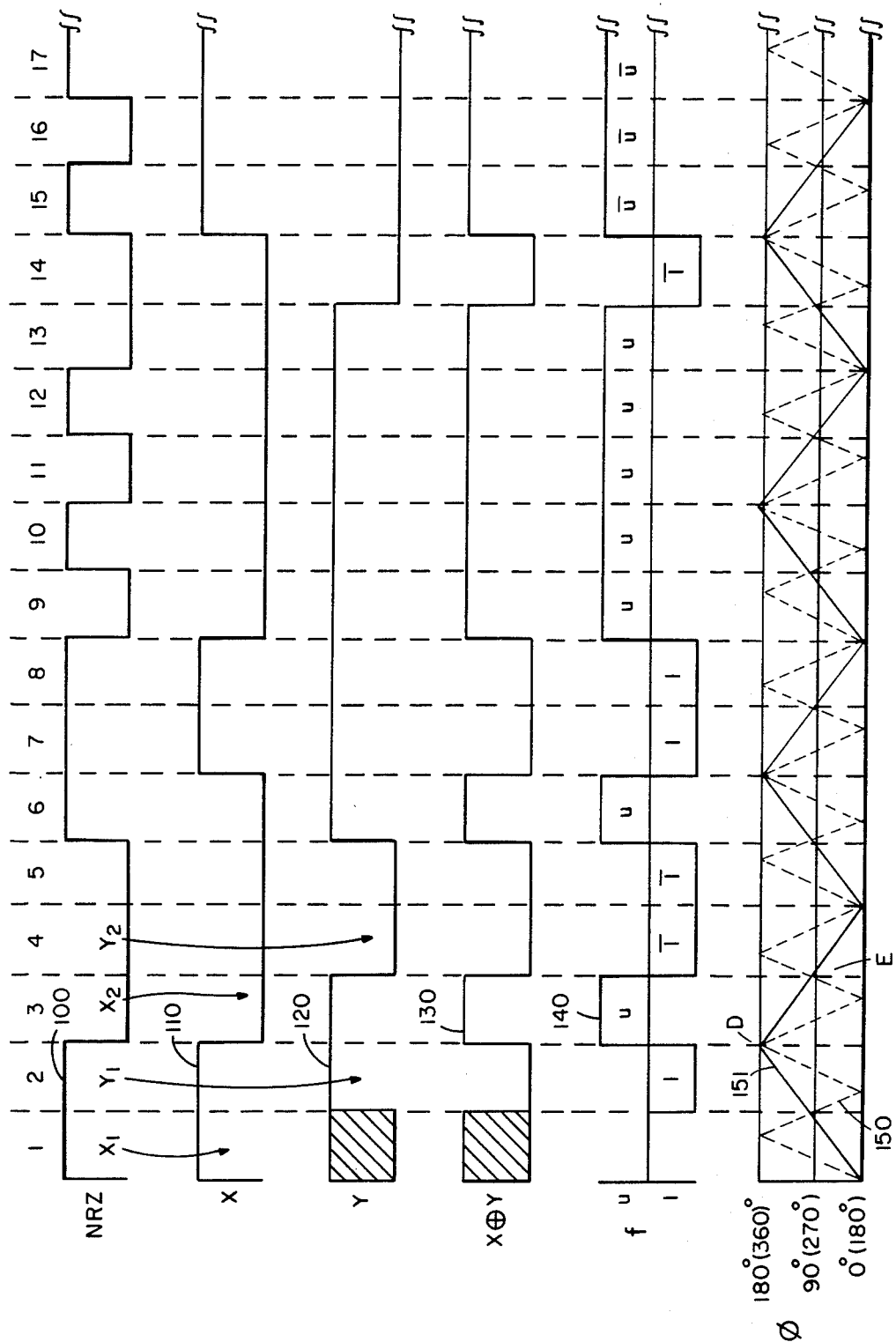
FIG. 2 shows a set of representative waveforms which illustrate the operation of the invention.

With reference now to FIG. 2, the operation of the modulator illustrated in FIG. 1 can be understood. In FIG. 2 there is shown waveform 100 which depicts an NRZ digital waveform of the type which might be introduced at the D inputs of the D flip-flops 32 and 33. With proper phasing of the NRZ signal and the BRC output from the programmable divider 30, the D flip-flops 32 and 33 will split waveform 100 into an X substream, waveform 110, at the Q output of D flip-flop 32, and a Y substream, waveform 120, at the Q output of D flip-flop 33. The exclusive-OR gate 40 will combine the X and Y substreams to provide waveform 130. With reference to the protocol defined above, the X substream represents the "a" value, the Y substream the "b" value, and the exclusive-or-ing of the X substream with the Y substream, the "c" value.

For the example shown in FIG. 2, the first two bits, numbered 1 and 2, of waveform 100 cause waveform 110 to assume a positive state to represent the mark in time slot 1 of waveform 100, labelled $X_1$. Similarly, waveform 120 rises during the second time period of waveform 100 to indicate the mark contained in that time period, labelled $Y_1$. Thus, substream X (waveform 110) assumes the state of the NRZ waveform (waveform 100) found in all of the odd time slots of the NRZ waveform beginning with the first. In a similar fashion, substream Y (waveform 120) assumes the state of the NRZ waveform contained in the even numbered time slots beginning with the second slots.

Selection of one of the coding frequencies, $f_u$ or $f_1$, is understood with reference to FIG. 1 and FIG. 2. In the second time period of waveform 100, waveform 130 assumes a low state indicating the state equivalence of the digital bits contained in time slots 2 and 1 of waveform 100. The ouptut of the gate 40 assumes a negative state at the beginning of time slot 2 as shown in waveform 130. The low state, inverted through inverter 51, opens the AND gate 42 allowing $f_1$ to be passed through the OR gate 43. Similarly, the comparison of the states of the NRZ waveform contained in time slots 3 and 2 results in the assumption of a positive state by waveform 130 at the output of the exclusive-OR gate 40 thus opening the AND gate 41 and providing $f_u$ at the output of the OR gate 43. Waveform 140 represents the composite waveform, output by the modulator, composed of $f_u$ and $f_1$.

In order to preserve the phase continuity of the modulated waveform, the AND gates 44 and 45 are configured to select either the positive state of the selected frequency or its inverse. This accomplishes the operation of the b term in equation (2). Thus, in the case where waveform 120 is positive in time slots 2 and 3, the AND gate 45 is activated allowing the positive $f_1$ and $f_u$ waveforms to pass and be provided at the output of the OR gate 46. The baud rate and frequencies $f_u$ and $f_1$ are represented by waveforms 150 and 151, respectively. In this example, for a baud rate of 100 bits per second, $f_u = 22,125$ and $f_1 = 22,075$ are selected. Thus, when the frequency of the modulated carrier output by the OR gate 46 changes between the second and the third time periods of waveform 140 from $f_1$ to $f_u$, the phase diagrams 150 and 151 show convergence at 180° at point D. Similarly, at the beginning of the fourth period when waveform 130 assumes a negative or low state, $f_1$ is selected. The low state of waveform 120 during the same period enables the AND gate 44 to pass the inverted $f_1$ waveform $\bar{f}_1$, as shown in waveform 140. Phase diagram 151 at point E shows the phase of $f_1$ to have progressed to 270°, indicating a phase of 90° for inverted $f_1$ which matches the phase of $f_u$ at point E. A similar analysis of the remainder of waveforms 100, 110, 120 will demonstrate that, for the selected values, the modulated wave comprising the frequencies $f_u$ and $f_1$ in fact maintains the phase continuity required for correct MSK modulation.

In the preferred embodiment, the desired baud rate is selected on the baud rate switch 60. The switch 60 is connected with the programmable dividers 15, 20, and 30 in such a manner as to simultaneously produce values for T, S, and V which result in the generation of values for $f_u$, $f_l$, and BRC which satisfy equation (1) whenever a particular baud rate is selected.

Selection of a particular rate on the switch 60 will select V to produce a baud rate clock equal to the frequency of the NRZ input. At the same time, it will establish T and S values which force PLLS 14 and 22 to output a UF and LF productive of a preselected $f_u$ and $f_l$. With the reference input frequency, $f_r$, to the PLLs equal to 1.25 KHz, as described hereinabove, the following table of values will result.

| BRC | $f_u$ | UF | $f_r$ | T = UF/$f_r$ | R = 80 |
|---|---|---|---|---|---|
| 50 | 22,112.5 | 2,211,250 | 1250 | 1769 | 80 |
| 100 | 22,125 | 2,212,500 | 1250 | 1770 | 80 |
| 200 | 22,150 | 2,215,000 | 1250 | 1772 | 80 |
| 800 | 22,300 | 2,230,000 | 1250 | 1784 | 80 |
| 1600 | 22,500 | 2,250,000 | 1250 | 1800 | 80 |

| BRC | $f_l$ | LF | $f_r$ | S = LF/$f_r$ | R = 80 |
|---|---|---|---|---|---|
| 50 | 22087.5 | 2,208,750 | 1250 | 1767 | 80 |
| 100 | 22075 | 2,207,500 | 1250 | 1766 | 80 |
| 200 | 22050 | 2,205,000 | 1250 | 1764 | 80 |
| 800 | 21900 | 2,190,000 | 1250 | 1752 | 80 |
| 1600 | 21700 | 2,170,000 | 1250 | 1736 | 80 |

Obviously, many modifications and variations of the present invention are possible in the light of the above teachings, and, it is therefore understood that within the scope of the disclosed inventive concept, the invention may be practiced otherwise than as specifically described.

What is claimed is:

1. A digital minimum-shift-keying modulator, comprising:
    oscillatory circuit means responsive to a master clock signal of fixed frequency for providing a first digital waveform of variable frequency and a second digital waveform of variable frequency not equal to the first, wherein the first and second frequencies are related in a predetermined manner;
    processing circuit means responsive to a serial stream of digital data, the data stream having a variable clock frequency, $f_o$, and comprising successive bit periods, the processing circuit means separating the serial stream into two substreams each having a clock frequency $f_o/2$, one substream comprising the succession of even-numbered bit periods of the serial stream and the other substream comprising the succession of odd-numbered bit periods of the serial stream; and
    combining circuit means coupled to the oscillatory means and the processing means for selecting one digital waveform when the states of the substreams are equivalent or the other digital waveform when the states of the substreams are opposite, and for responding to the state of one substream when the selection is made to provide either the selected waveform or its inverse as an output.

2. A modulator according to claim 1 wherein the oscillatory circuit means comprises:
    source means coupled to receive the master clock signal for producing a first reference waveform whose frequency is a fraction of the frequency of the master clock; and
    a separate generating circuit for each digital waveform, each generating circuit comprising:
    a phase lock loop responsive to two reference waveforms for providing a source waveform, the frequency of the source waveform varying according to the phase difference between the reference waveforms;
    wherein the phase lock loop is coupled to the source means to receive the first reference waveform;
    a variable first circuit means operatively coupled to receive the source waveform for deriving a second reference waveform of variable frequency, the second reference waveform being provided to the oscillator; and
    reducing circuit means coupled to receive the source waveform for reducing the frequency of the source waveform to produce a digital waveform having a frequency which is a fraction of the source waveform.

3. A modulator according to claim 2 wherein the source means comprises a divider circuit.

4. A modulator according to claim 3 wherein the variable first circuit means comprises a divider circuit having a variable divisor.

5. A modulator according to claim 1 wherein the processing circuit means comprises:
    variable clock circuit means responsive to the master clock signal for deriving therefrom a first clock waveform having a frequency which is varied to equal $f_o$; and
    storage means having at least two sections, the storage means coupled to receive the serial stream of digital data and responsive to the first clock waveform for storing on one section the state of the data stream occurring during odd-numbered clock periods beginning with the first, and for storing in another section the state of the data stream occurring during even-numbered clock periods beginning with the second, the storage in each section lasting for two clock periods.

6. A modulator according to claim 5 wherein the variable clock circuit means comprises a programmable counter.

7. A modulator according to claim 1 wherein the combining circuit means comprises:
    an exclusive-OR gate for comparing the states of the substreams;
    selective gating means coupled to receive an output of the exclusive-OR gate for selecting and providing as an output the first digital waveform when the states of the substreams are equivalent, or the second digital waveform when the states are unequal; and
    phase gating means coupled to receive the output of the selective gating means and said one substream for providing as an output the selected digital waveform when the substream is in one state and for providing the inverse of the selected digital waveform when the substream is in the opposite state.

8. A modulator according to claim 7 wherein the oscillatory circuit means comprises:
    source means coupled to receive the master clock signal for producing a first reference waveform whose frequency is a fraction of the frequency of the master clock; and
    a separate generating circuit for each digital waveform, each generating circuit comprising:
    a phase lock loop responsive to two reference waveforms for providing a source waveform, the frequency of the source waveform varying according to the phase difference between the reference waveforms;

wherein the phase lock loop is coupled to the source means to receive the first reference waveform;

a variable first circuit means operatively coupled to receive the source waveform for deriving a second reference waveform of variable frequency, the second reference waveform being provided to the oscillator; and reducing circuit means coupled to receive the source waveform for reducing the frequency of the source waveform to produce a digital waveform having a frequency which is a factor of the source waveform.

9. A modulator as in claim 8 wherein the first reference waveform source means comprises a divider circuit.

10. A modulator as in claim 9 wherein the variable first circuit means comprises a divider circuit having a variable divisor.

11. A modulator as in claim 10 wherein the processing circuit comprises:

variable clock circuit means responsive to the master clock signal for deriving therefrom a first clock waveform having a frequency which is varied to equal $f_o$; and storage means having at least two sections, the storage means coupled to receive the serial stream of digital data and responsive to the first clock waveform for storing in one section the state of the data steam occurring during odd-numbered clock periods beginning with the first, and for storing in another section the state of the data stream occurring during even-numbered clock periods beginning with the second, the storage in each section lasting for two clock periods.

12. A modulator as in claim 11 wherein the variable clock circuit means comprises a divider circuit having a variable divider.

13. A modulator as in claim 12 wherein the reducing circuit means comprises a presettable counter configured as a divider.

14. A modulator as in claim 13 further including a low pass filter means coupled to receive the output of the phase gating means for converting the phase gating output to a sinusoid.

* * * * *